US009932514B2

(12) United States Patent
Zhang et al.

(10) Patent No.: US 9,932,514 B2
(45) Date of Patent: Apr. 3, 2018

(54) COMPOSITIONS AND METHODS FOR MAKING AQUEOUS SLURRY

(71) Applicant: Trican Well Service Ltd., Calgary, Alberta (CA)

(72) Inventors: Kewei Zhang, Calgary (CA); Shang Ying Liu, Calgary (CA); Chuanzhong Wang, Calgary (CA); Weibing Lu, Calgary (CA)

( * ) Notice: Subject to any disclaimer, the term of this patent is extended or adjusted under 35 U.S.C. 154(b) by 102 days.

(21) Appl. No.: 14/696,125

(22) Filed: Apr. 24, 2015

(65) Prior Publication Data
US 2015/0307772 A1    Oct. 29, 2015

(51) Int. Cl.
| | |
|---|---|
| *C09K 8/68* | (2006.01) |
| *C09K 8/80* | (2006.01) |
| *C09K 8/88* | (2006.01) |
| *C09K 8/70* | (2006.01) |
| *C09K 8/94* | (2006.01) |

(52) U.S. Cl.
CPC .............. *C09K 8/68* (2013.01); *C09K 8/805* (2013.01); *C09K 8/882* (2013.01); *C09K 8/703* (2013.01); *C09K 8/94* (2013.01); *C09K 2208/28* (2013.01)

(58) Field of Classification Search
None
See application file for complete search history.

(56) References Cited

U.S. PATENT DOCUMENTS

| | | | |
|---|---|---|---|
| 2,331,594 A | 10/1943 | Blair, Jr. |
| 2,419,755 A | 4/1947 | Albaugh |
| 2,765,851 A | 10/1956 | Bond |
| 2,885,078 A | 5/1959 | Fenske |
| 2,935,475 A | 5/1960 | Bernard |
| 3,060,210 A | 10/1962 | De Groote et al. |
| 3,179,250 A | 4/1965 | Bunge et al. |
| 3,271,307 A | 9/1966 | Dickson et al. |
| 3,361,213 A | 1/1968 | Savins |
| 3,373,107 A | 3/1968 | Rice et al. |
| 3,505,374 A | 4/1970 | Monroe |
| 3,595,390 A | 7/1971 | Booth |
| 3,696,923 A | 10/1972 | Miller |
| 3,757,864 A | 9/1973 | Crawford et al. |
| 3,857,444 A | 12/1974 | Copeland |
| 3,864,137 A | 2/1975 | Van Bonin et al. |
| 3,868,318 A | 2/1975 | Clark et al. |
| 3,945,435 A | 3/1976 | Barry |
| 3,980,136 A | 9/1976 | Plummer et al. |
| 3,990,978 A | 11/1976 | Hill |
| 4,000,781 A | 1/1977 | Knapp |
| 4,003,393 A | 1/1977 | Jaggard et al. |
| 4,007,128 A | 2/1977 | Poklacki |
| 4,042,031 A | 8/1977 | Knapp |
| 4,046,795 A | 9/1977 | Martin |
| 4,054,161 A | 10/1977 | Alack |
| 4,061,580 A | 12/1977 | Jahnke |
| 4,183,814 A | 1/1980 | Ramachandran |
| 4,231,428 A | 11/1980 | Needham et al. |
| 4,301,868 A | 11/1981 | Scherubel et al. |
| 4,316,810 A | 2/1982 | Burnham |
| 4,368,136 A | 1/1983 | Murphey |
| 4,454,056 A | 6/1984 | Kittelmann et al. |
| 4,512,405 A | 4/1985 | Sweatman et al. |
| 4,537,595 A | 8/1985 | Gruning et al. |
| 4,564,456 A | 1/1986 | Homan |
| 4,585,064 A | 4/1986 | Graham et al. |
| 4,654,161 A | 3/1987 | Kollmeier et al. |
| 4,689,085 A | 8/1987 | Plueddemann |
| 4,725,351 A | 2/1988 | Mehrotra |
| 4,832,702 A | 5/1989 | Kummer et al. |
| 4,857,221 A | 8/1989 | Brookes et al. |
| 4,891,166 A | 1/1990 | Schaefer et al. |
| 4,898,957 A | 2/1990 | Plueddemann et al. |
| 4,933,327 A | 6/1990 | Plueddemann et al. |
| 4,960,845 A | 10/1990 | O'Lenick, Jr. |
| 4,964,465 A | 10/1990 | Surles |
| 5,098,979 A | 3/1992 | O'Lenick, Jr. |
| 5,110,485 A | 5/1992 | Huddleston |
| 5,149,765 A | 9/1992 | O'Lenick, Jr. |
| 5,166,297 A | 11/1992 | O'Lenick, Jr. |
| 5,209,775 A | 5/1993 | Bank et al. |
| 5,235,082 A | 8/1993 | Hill et al. |
| 5,240,760 A | 8/1993 | George et al. |
| 5,256,805 A | 10/1993 | O'Lenick, Jr. |

(Continued)

FOREIGN PATENT DOCUMENTS

| | | |
|---|---|---|
| CA | 1071076 | 2/1980 |
| CA | 1104804 | 7/1981 |

(Continued)

OTHER PUBLICATIONS

"Spheriglass Solid Glass Microspheres," Potters Industries LLC, retrieved from the Internet: http://www.pottersbeads.com/egm/NorthAmerica/Products/SolidGlassMicrospheres/SPHERIGLASS/SPHERIGLASSAGlass.aspx, 2016.
International Search Report and Written Opinion (PCT/CA2006/000705); dated Aug. 25, 2006.
International Search Report and Written Opinion (PCT/CA2006/001567); dated Jan. 3, 2007.
International Search Report and Written Opinion (PCT/CA2008/000786); dated Aug. 18, 2008.
International Search Report and Written Opinion (PCT/CA2008/001293); dated Nov. 10, 2008.
International Search Report and Written Opinion (PCT/CA2011/000065); dated Apr. 11, 2011.
Extended European Search Report (EP 08748188.3); dated Mar. 8, 2011.

(Continued)

*Primary Examiner* — Jeffrey Washville

(57) ABSTRACT

An aqueous slurry composition for use in industries such as petroleum and pipeline industries, such as for use as a fracturing fluid. The aqueous slurry composition includes a particulate, an aqueous liquid and a chemical compound that renders the particulate surface hydrophobic. The slurry is produced by rendering the surface of the particulate hydrophobic during or prior to making the slurry.

25 Claims, No Drawings

(56) References Cited

U.S. PATENT DOCUMENTS

| | | | |
|---|---|---|---|
| 5,292,908 A | 3/1994 | Onikata et al. | |
| 5,306,434 A | 4/1994 | Schuller et al. | |
| 5,332,791 A | 7/1994 | Knoll et al. | |
| 5,359,104 A | 10/1994 | Higgs et al. | |
| 5,474,835 A | 12/1995 | McCarthy et al. | |
| 5,616,758 A | 4/1997 | McCarthy et al. | |
| 5,643,672 A | 7/1997 | Marchi et al. | |
| 5,646,215 A | 7/1997 | Lee | |
| 5,653,794 A | 8/1997 | Weber et al. | |
| 5,693,837 A | 12/1997 | Smith et al. | |
| 5,798,144 A | 8/1998 | Varanasi et al. | |
| 5,824,226 A | 10/1998 | Boyd et al. | |
| 5,858,928 A | 1/1999 | Aubert et al. | |
| 6,047,772 A | 4/2000 | Weaver et al. | |
| 6,060,521 A | 5/2000 | Sekutowski et al. | |
| 6,132,638 A | 10/2000 | Oldenhove | |
| 6,187,720 B1 | 2/2001 | Acker et al. | |
| 6,277,361 B1 | 8/2001 | Murray | |
| 6,297,210 B1 | 10/2001 | Hsu et al. | |
| 6,323,268 B1 | 11/2001 | Fisher et al. | |
| 6,403,163 B1 | 6/2002 | Fisher et al. | |
| 6,482,969 B1 | 11/2002 | Helmrick et al. | |
| 6,524,597 B2 | 2/2003 | Kashimoto | |
| 6,586,497 B2 | 7/2003 | Gay et al. | |
| 6,649,571 B1 | 11/2003 | Morgan | |
| 6,696,052 B2 | 2/2004 | Aeby et al. | |
| 6,729,409 B1 | 5/2004 | Gupta et al. | |
| 6,736,891 B1 | 5/2004 | Bice et al. | |
| 6,830,811 B2 | 12/2004 | Chao | |
| 7,066,258 B2 | 6/2006 | Justus et al. | |
| 7,066,528 B1 | 6/2006 | Crean | |
| 7,135,231 B1 | 11/2006 | Sinclair et al. | |
| 7,388,033 B2 | 6/2008 | Nagy et al. | |
| 7,581,590 B2 | 9/2009 | Lesko et al. | |
| 7,723,274 B2 | 5/2010 | Zhang | |
| 7,977,285 B2 | 7/2011 | Zhang et al. | |
| 8,105,986 B2 | 1/2012 | Zhang | |
| 8,236,738 B2 | 8/2012 | Zhang | |
| 8,499,835 B2 | 8/2013 | Zhang et al. | |
| 2003/0102128 A1 | 6/2003 | Dawson et al. | |
| 2003/0146134 A1 | 8/2003 | Yoon | |
| 2003/0217953 A1 | 11/2003 | Xu et al. | |
| 2004/0023818 A1 | 2/2004 | Nguyen et al. | |
| 2004/0082055 A1 | 4/2004 | Hince et al. | |
| 2005/0092489 A1 | 5/2005 | Welton et al. | |
| 2005/0187112 A1 | 8/2005 | Goodhue, Jr. et al. | |
| 2005/0194142 A1 | 9/2005 | Nguyen et al. | |
| 2005/0244641 A1 | 11/2005 | Vincent | |
| 2005/0252658 A1 | 11/2005 | Willingham et al. | |
| 2006/0260810 A1 | 11/2006 | Weaver et al. | |
| 2007/0015669 A1 | 1/2007 | Zhang | |
| 2007/0129257 A1 | 6/2007 | Kippie et al. | |
| 2007/0144736 A1 | 6/2007 | Shinbach et al. | |
| 2007/0197402 A1 | 8/2007 | O'neil et al. | |
| 2008/0173451 A1 | 7/2008 | Reddy et al. | |
| 2010/0029515 A1 | 2/2010 | O'neil et al. | |
| 2010/0197526 A1 | 8/2010 | Zhang | |
| 2010/0204071 A1* | 8/2010 | Zhang | B03D 1/01 507/239 |
| 2010/0256024 A1 | 10/2010 | Zhang | |
| 2010/0267593 A1 | 10/2010 | Zhang | |
| 2011/0011589 A1 | 1/2011 | Zhang et al. | |
| 2012/0071371 A1 | 3/2012 | Zhang | |
| 2012/0073171 A1 | 3/2012 | Boltz et al. | |
| 2012/0181019 A1 | 7/2012 | Saini et al. | |
| 2012/0245276 A1 | 9/2012 | Hagadorn et al. | |
| 2012/0267105 A1 | 10/2012 | Zhang | |
| 2012/0267112 A1 | 10/2012 | Zhang et al. | |
| 2012/0267122 A1 | 10/2012 | Zhang et al. | |
| 2012/0322697 A1 | 12/2012 | Zhang | |
| 2014/0243245 A1 | 8/2014 | Zhang | |
| 2014/0357537 A1* | 12/2014 | Wadekar | C09K 8/72 507/240 |
| 2015/0252254 A1 | 9/2015 | Zhang et al. | |
| 2016/0017213 A1 | 1/2016 | Zhang et al. | |
| 2016/0340571 A1* | 11/2016 | Liang | C09K 8/68 |

FOREIGN PATENT DOCUMENTS

| | | |
|---|---|---|
| CA | 1250856 | 3/1989 |
| CA | 2009732 | 8/1990 |
| CA | 2213168 | 2/1998 |
| CA | 2408052 | 11/2001 |
| CA | 2329600 | 6/2002 |
| CA | 2423031 | 10/2003 |
| CA | 2509115 | 12/2005 |
| CA | 2545563 | 11/2006 |
| CA | 2531982 | 7/2007 |
| CA | 2683516 | 10/2008 |
| CA | 2684966 | 11/2008 |
| CA | 2848264 | 11/2008 |
| CA | 2693427 | 1/2009 |
| CA | 2708144 | 6/2009 |
| CA | 2547150 | 1/2010 |
| CA | 2643251 | 5/2010 |
| CA | 2690768 | 7/2011 |
| CA | 2787132 | 7/2011 |
| CA | 2735428 | 9/2011 |
| EP | 0113310 | 7/1984 |
| EP | 0266043 | 5/1988 |
| GB | 1584831 | 2/1981 |
| GB | 2387191 | 10/2003 |
| JP | 58-146434 | 9/1983 |
| SU | 1126590 | 11/1984 |
| WO | 0222759 | 3/2002 |
| WO | 03018508 | 3/2003 |
| WO | 2005100007 | 10/2005 |
| WO | 2005124099 | 12/2005 |
| WO | 2006116868 | 11/2006 |
| WO | 2007033489 | 3/2007 |
| WO | 2007145734 | 12/2007 |
| WO | 2008124919 | 10/2008 |
| WO | 2008131540 | 11/2008 |

OTHER PUBLICATIONS

Extended European Search Report (EP 11734286.5); dated May 31, 2013.

"Spheriglass Solid Glass Microspheres," Potters Industries LLC, retrieved from the Internet: http://www.pottersbeads.com/egm/NorthAmerica/Products/SolidGlassMicrospheres/SPHERIGLASS/SPHERIGLASSAGlass.aspx, 2016.

* cited by examiner

COMPOSITIONS AND METHODS FOR MAKING AQUEOUS SLURRY

CROSS-REFERENCE TO RELATED APPLICATIONS

This application claims priority to Canadian Patent Application Serial No. 2,849,848, filed on Apr. 25, 2014, and to Canadian Patent Application Serial No. 2,857,890, filed on Jul. 29, 2014, the entire contents of each of which are hereby expressly incorporated herein by reference.

FIELD OF THE INVENTION

This invention relates to an aqueous slurry composition for transporting particulates and to a method of making such a composition.

BACKGROUND

Aqueous slurries, which basically comprise an aqueous medium and particulates are commonly used in the oil and gas industry to transport particulates through a pipe or tube, either on ground, or from the surface to a subterranean formation or from a subterranean formation to the surface. The most commonly used particulates include sand, ceramic particulates, glass spheres, bauxite (aluminum oxide) particulates, resin coated particulates and synthetic particulates (with sand being the most commonly used particulate). The particulates normally range in size from about 10 to about 100 U.S. mesh, which is from about 150 to 2000 μm in diameter, and have significantly higher density than water. For example, the density of sand is typically about 2.6 g/cm$^3$ while the density of water is 1 g/cm$^3$. Sand is by far the most commonly used particulate.

Aqueous slurries are widely used in oil and gas industry including drilling and hydraulic fracturing operations. To make relatively stable slurry, the particulates must be suspended in a liquid medium for a lengthy period of time at static and/or dynamic conditions, and therefore the viscosity or viscoelasticity of the liquid medium must be sufficiently high to be able to suspend the particulates. The most commonly used method for increasing viscosity or viscoelasticity of an aqueous liquid is by adding a viscosifier, for example, a natural or synthetic polymer or a viscoelastic surfactant to the liquid medium.

Hydraulic fracturing is a technology used to enhance oil and gas production from a subterranean formation. During the operation, a fracturing fluid is injected through a wellbore into a subterranean formation at a pressure sufficient to initiate fractures in the formation. Frequently, the fracturing fluid comprises particulates, commonly known as proppants, suspended in the fluid and transported as a slurry into the fractures. At the last stage of the fracturing operation, fracturing fluid is flowed back to the surface leaving proppants in the fractures forming proppant packs to prevent fractures from closing after pressure is released (i.e., the particulates "prop" open the factures). The proppant packs provide highly conductive channels for hydrocarbon to effectively seep through the subterranean formation. Proppants, including sands, ceramic particulates, bauxite particulates, glass spheres, resin coated sands, synthetic particulates and the like, are known in the industry. Among them sands are by far the most commonly used proppants. As noted above, the proppants normally range in size from about 10 to 100 U.S. mesh, which is about 150 to 2000 μm in diameter.

Fracturing fluids in common use include various aqueous-based and non-aqueous based (e.g., hydrocarbon-based) fluids. Due to their low cost and high versatility, aqueous-based fluids are preferred and most commonly used. To better transport particulates, water-soluble viscosifiers, such as polymers (i.e., linear or cross-linked polymers) or viscoelastic surfactants are commonly added to increase fluid viscosity. For example, a polymer, such as guar gum or its derivatives, is added into an aqueous liquid wherein the physical entanglement of polymer chains increases the fluid viscosity and thus its suspension capability. To further enhance fluid viscosity, it is common to chemically cross-link polymer chains by certain chemical compounds forming cross-linked gel. Guar gum cross-linked by borates is one of the examples. Compared to the cross-linked fluid, linear gels, i.e., fluids containing sufficient amount of polymers without cross-linking, cause less formation damage and are more cost-effective, but have relatively poor suspension capability. As well, viscoelastic surfactants cause less damage, but are much more expensive. In recent years, slick water, i.e., water containing very small amounts of friction reducing agent (usually in the range from about 0.015% to 0.06% of the fluid), is widely used as a fracturing fluid, especially for fracturing shale formations. Various water-soluble polymers including guar gum and its derivatives and polyacylamide and its derivatives have been used as friction reducing agents. Polyacrylamides, including different polyacrylamides copolymers, are most widely used as friction reducing agents in hydraulic fracturing operations.

As noted above, the last stage of a fracturing treatment involves the flowing of the fracturing fluid back to the surface while the proppants are left in the fractures. It is not unusual for a significant amount of proppant to be carried out of the fractures and into the wellbore along with the fluids being flowed back out the well. This process is known as proppant flowback. Proppant flowback is highly undesirable because it not only reduces the amount of proppants remaining in the fractures resulting in less conductive channels, but also causes significant operational difficulties. This problem has long plagued the petroleum industry because of its adverse effect on well productivity and equipment. Numerous methods have been attempted in an effort to find a solution to the problem of proppant flowback. The commonly used method is the use of so-called "resin-coated proppants". The outer surfaces of the resin-coated proppants have an adherent resin coating so that the proppant grains are bonded to each other under suitable conditions forming a permeable barrier and reducing the proppant flowback (i.e., the proppant grains become tacky and stick together to reduce proppant flowback). For example, see U.S. Pat. Nos. 4,585,064 and 6,047,772.

There are significant limitations to the use of resin coated proppants, including that the method is expensive and operationally challenging. For example, resin-coated proppants are much more expensive than normal sands, especially considering that a fracturing treatment usually employs tons of proppants in a single well. Normally, when the formation temperature is below 60° C., activators are required to make the resin-coated proppants bind together. This increases the cost.

There is thus a need for a composition and method for making slurry which can form a stable proppant pack and resist/reduce proppant flowback, while at the same time is more cost effective and/or operationally simple.

When drilling subterranean formations for oil and gas, aqueous-based drilling fluids are normally used. During the drilling process large amounts of particulates, called cuttings are generated. Cuttings have different sizes ranging from fines to pebbles. The drilling fluid is circulated through the wellbore to make slurry with the cuttings in situ and transports them out of wellbore. In most cases, polymers as well as clays are added to the drilling fluids to increase their viscosity/viscoelasticity in order to transport the cuttings efficiently. However, polymers, as well as clay fines, can easily penetrate into pores or thin fractures in a formation and significantly reduce formation permeability, especially at near wellbore. Reduced formation permeability impedes oil and/or gas production. Therefore it is highly desirable to have a drilling fluid that can make stable slurry in situ with the cuttings and transport them out of the wellbore, while causing less formation damage.

In oil sand operation massive amount of sands are left after oil is stripped off sand surface. Finding a more cost effective way to transport sands efficiently over distance through pipelines has long been required in the industry. Thus, a composition and a method for making stable and highly fluid sand slurries at low cost would be quite useful.

U.S. Pat. Nos. 7,723,274 and 8,105,986 teach a different way of enhancing the transporting capability of a slurry. Instead of focusing on improving fluid rheology, the patents teach enhancing the transporting capability of a slurry by rendering the particulate surfaces sufficiently hydrophobic to attach gas bubbles to particulate surfaces, and thus, buoying the particulates up. Consequently, particulates can be transported into the formation effectively without requiring addition of viscosifiers to the fluid. Different hydrophobising agents, including silicone compounds or hydrocarbon amines, are disclosed in U.S. Pat. Nos. 7,723,274 and 8,105,986.

In this application, we disclose an aqueous slurry composition, including methods of making and using such compositions, that is intended to address some of the deficiencies and problems with known slurry compositions (as discussed above). This aqueous slurry composition comprises an aqueous liquid, particulates and an amine functionalized hydrophobic polymer. This composition can be used in different operations, especially oil field operations, to efficiently transport particulates through a pipe or tube.

SUMMARY OF THE INVENTION

According to one aspect of the present invention there is provided an aqueous slurry composition comprising an aqueous liquid, particulates and an amine functionalized hydrophobic polymer that renders the surface of the particulates hydrophobic; and the method of making such aqueous slurry composition.

According to another aspect of the present invention, there is provided an aqueous fracturing slurry composition comprising an aqueous liquid, proppants and an amine functionalized hydrophobic polymer that renders the surface of the proppants hydrophobic; a frother and the method of making such aqueous fracturing slurry composition.

According to a further aspect of the present invention, there is provided an aqueous fracturing slurry composition comprising an aqueous liquid, proppants, an amine functionalized hydrophobic polymer that renders the surface of the proppants hydrophobic, and a gas; and the method of making such aqueous fracturing slurry composition.

According to another aspect of the present invention, there is provided an aqueous fracturing slurry composition comprising an aqueous liquid, proppants and an amine functionalized hydrophobic polymer that renders the surface of the proppants hydrophobic, and an oil, and the method of making such aqueous fracturing slurry composition.

DETAILED DESCRIPTION OF THE INVENTION

For purposes of this specification and the claims appended thereto, the term "hydrophobic polymer" is used herein to mean any polymer that is non-wetting to water and typically has a water contact angle approximately equal to or greater than 90°. Examples of hydrophobic polymers, by way of illustration only, include: (a) polyolefins, which is a class of polymers or copolymers synthesized from a simple olefin as a monomer including ethylene, propylene and butene. Polyolefin includes polyethylene, polypropylene, polybutene, polyisobutylene, poly(isoprene), poly(4-methyl-1-pentene), ethylene propylene copolymers, ethylene-propylene-hexadiene copolymers, and ethylene-vinyl acetate copolymers; (b) styrene polymers, including poly(styrene), poly(2-methyl-styrene), styrene-acrylonitrile copolymers having less than about 20 mole-percent acrylonitrile; (c) vinyl polymers, such as poly(vinyl butyrate}, poly(vinyl decanoate), poly(vinyl dodecanoate), poly(vinyl hexadecanoate), poly(vinyl hexanoate), poly(vinyl propionate), poly(vinyl octanoate), and poly(methacrylonitrile); (d) acrylic polymers, including poly(n-butyl acetate), poly(ethyl acrylate); methacrylic polymers, such as poly(benzyl methacrylate), poly(n-butyl methacrylate), poly(isobutyl methacrylate), poly(t-butyl methacrylate), poly(dodecyl methacrylate), poly(ethyl methacrylate), poly(2-ethylhexyl methacrylate), poly{n-hexyl methacrylate), poly(phenyl methacrylate), poly(n-propyl methacrylate), poly(octadecyl methacrylate); (e) polyesters, such as poly(ethylene terephthalate), poly(butylene terephthalate), and poly(ethylene terenaphthalate). Normally the hydrophobic polymers of low or moderate molecular weights are preferred. Furthermore, hydrophobic polymers that are liquid or viscous liquid at moderate conditions are also preferred.

The term "amine functionalized hydrophobic polymer" is used herein to mean any hydrophobic polymer that is functionalized by attaching one or more organic amine groups or its derivatives to the polymer chain, either at the end or middle or both. Different organic amine or its derivatives can be grafted to the hydrophobic polymers including, for example, organic primary, secondary, tertiary or quaternary amine or its derivatives. The presence of the amine group allows the polymers to more effectively adsorb to the surface of the particulates such as sand. Examples of amine functionalized hydrophobic polymers, by way of illustration only, include: (a) amine functionalized polyolefin including polybutyl amine, polyisobutylene amine, polyisobutylene succinimide, amine functionalized polyethylenes, amine-terminated olefin copolymer and amine functionalized polypropylenes; (b) amine functionalized styrene polymers such as polystyrene amine, copolymers of styrene and dimethylamino propylamine maleimide; (c) amine functionalized vinyl polymers; (d) amine functionalized acrylic polymers including amine functionalized poly(t-butyl methacrylate), poly(t-butylaminoethyl methacrylate); and (e) amine functionalized polyesters, including amine functionalized polylactide. Examples of these polymers have been disclosed in various patents including U.S. Pat. Nos. 4,832,702; 5,332,791; 5,646,215; 7,388,033 and US Publication No. 2012/0245276. Furthermore, in some cases, the amine functionalized hydrophobic polymers contain reactive groups which can be used to crosslink covalently with each other or with other organic molecules in the compositions or with the particulate surfaces.

The term "frother" is used herein to mean compounds that act to stabilize bubbles in the slurry. The most commonly used frothers are aliphatic alcohols, including particularly, methyl isobutyl carbinol (MIBC), 2-ethyl hexanol, n-pentanol, n-butyl, n-hexanol, 2-butanol, n-heptanol, n-octanol, isoamyl alcohol as well as cyclic alcohols including pine oil, terpineol, fenchyl alcohol, alkoxy paraffins such as 1,1,3,-triethoxybutane (TEB) and polypropyl glycol ethers such as commercial products Dowfroths by Dow Chemicals Company. It is understood that mixtures of the frothers such as mixtures of the alcohols are often used. As well, oils including hydrocarbon oils such as mineral oils or paraffin oils and natural oils can be used alone or in combination with, for example, an alcohol frother, as a frother to stabilize the bubbles on the particulate surfaces and enhance particulate agglomeration.

The term "aqueous liquid", "aqueous fluid" and "aqueous medium" means water, salt solutions, water containing an alcohol or other organic solvents and other water-based fluids that would be known to a person skilled in the art. It should be understood that the additives other than water in the aqueous liquid are used in amounts or in a manner that does not adversely affect the present invention.

The size of particulates (i.e., proppants) in compositions according to the invention is generally between about 10-100 U.S. mesh, which is about 150 to 2000 µm in diameter. It should be understood that the size distribution of the proppants can be narrow or wide. Suitable proppants include sands, ceramic proppants, glass beads/spheres, bauxite proppants, resin coated sands, synthetic particulates and any other proppants known in the industry.

Slurries according to the present invention can be made on the surface or in situ in a subterranean formation. Furthermore, a gas can be mixed into the slurry. Suitable gases include air, carbon dioxide, nitrogen, methane and mixtures thereof. The gas can be introduced into the slurry during preparation thereof. For example, when the slurry is pumped through a pipe, gas such as air or nitrogen can be introduced into the slurry.

In an aqueous liquid, it is common that an inorganic solid possesses surface charges, either negative or positive, depending on its composition and the pH of the liquid. Large molecules, especially ionic ones having charges opposite to those on the solid surface, readily adsorb on the surface because of predominantly electrostatic attraction. For example, an amine functionalized polyisobutylene or polyisobutylene succinimide, which carries positive charges in aqueous liquid, can readily adsorb on sand surface which possesses negative charges. As well in some cases, the amine functionalized hydrophobic polymer can also adsorb onto inorganic oxide surfaces through hydrogen bonding. In carrying out the present invention, the amine functionalized hydrophobic polymer, for example, polyisobutylene succinimide, can be first dissolved or dispersed in a solvent or a liquid mixture and then mixed with an aqueous liquid containing the particulates.

For hydraulic fracturing operations, slurries according to the present invention can be prepared, for example, by mixing an aqueous liquid, an amine functionalized hydrophobic polymer and proppants, using conventional mixing method at sufficient shear. Alternatively, proppants can be first treated by contacting a liquid medium containing an amine functionalized hydrophobic polymer to render the particulate surfaces hydrophobic and then separating the proppants from the medium. The pre-hydrophobized proppants can later be mixed with an aqueous liquid to make the slurry. As well, during a hydraulic fracturing operation, prior to adding into the blender, proppants can be treated by contacting with a medium containing an amine functionalized hydrophobic polymer, such as polyisobutylene succinimide, to render their surfaces hydrophobic and the pre-hydrophobized proppants are subsequently mixed with an aqueous liquid while pumping. In each case, a frother or a frother/oil combination can be added to the compositions, either before or after proppants being added to the blender, to enhance the flotation and agglomeration of the particulates. Furthermore, a gas, such as air, nitrogen or carbon dioxide and mixtures thereof, can also be mixed into the slurry under agitation.

The slurry can be prepared on surface (above ground) or in a subterranean formation where proppants, an aqueous fluid, an amine functionalized hydrophobic polymer are mixed in situ. Different aqueous-based fracturing fluids known in the industry can be used making the slurries, for example, an aqueous fluid comprising a linear gel. It is especially beneficial to use the present invention in a slick water fracturing operation, wherein the fluid itself has very limited proppant transportation capability. Polyacrylamide polymer or its copolymers including hydrophobically modified polyacylamide, can be used as the friction reducing agent.

Various proppants, including sands and ceramic proppants, can be treated according to the present invention during manufacturing process, where the proppants are treated and then transported to the well site for the fracturing operations. With the composition of the present invention, high concentration of proppants can easily be pumped into a formation and the proppants are more evenly distributed in the fracture, leading to improved proppant conductivity.

The amine functionalized hydrophobic polymer can be added straight or premixed with a solvent. Similarly, one can use pre-hydrophobised proppants to make the slurry while the slurry is pumped into the well during a fracturing operation. Another benefit of the slurries of the present invention is that the aqueous liquid can be re-used after it is separated from the proppants after a fracturing operation. This has great significance considering there is limited water supply in the world for hydraulic fracturing operations.

The present invention also provides a method for preventing proppant flowback after a fracturing treatment. In field operations, proppants can be pumped into a formation using the composition of the present invention. Alternatively, a fluid medium containing an amine functionalized hydrophobic polymer, for example, an amine functionalized polyisobutylene, can be pumped into the formation following the proppant stage to mix with particulates already in the formation. The particulates in the slurry tend to agglomerate moving cohesively in contrast to conventional slurries under the same conditions. As well, different oils including hydrocarbon oils, mineral oils, vegetable oils, or mixtures thereof, can be included in the composition to further enhance the proppant agglomerations. The slurry of the present invention is particularly useful in gravel-pack operations where sand slurry is normally pumped into a wellbore to prevent excessive amount of sands from flowing into the wellbore from the formation. The present method is cost effective and the sand pack formed has a high conductivity. Similarly, the slurry can also be used in so-called formation consolidation operations. In such an operation, a fluid containing an amine functionalized hydrophobic polymer, for example, an amine functionalized polyisobutylene, is injected into a formation to increase cohesiveness among sand grains to consolidate the formation and to reduce sand production.

In drilling operations, amine functionalized hydrophobic polymer, for example, an amine functionalized polyisobutylene or polyisobutylene succinimide, can be added into an aqueous-based drilling fluid. It is particularly useful when the amine functionalized hydrophobic polymer is added to water or brine for use as a drilling fluid. During a drilling operation, the fluid forms slurry with cuttings in situ and transports the cuttings out of the wellbore. As well, a frother or a frother/oil combination can be added. Furthermore, a gas such as nitrogen or carbon dioxide can be mixed with the slurry during drilling. Since it is not necessary to use polymers or clays to viscosify the fluid, there is much less formation damage. Moreover, the cuttings can be easily removed on the surface and the aqueous liquid becomes re-useable. Different formations including sandstone, carbonate, shale and coal seams can be drilled using the slurry of the present invention.

Similarly, in wellbore cleanout operations, for example, water containing amine functionalized hydrophobic polymer can be circulated through the wellbore and form slurry with debris in situ. The debris is subsequently transported out of the wellbore. The fluid is re-useable after separation from the debris. As well, a frother or a frother/oil combination can be added.

For transporting particulates through pipelines slurry can be prepared by mixing an aqueous liquid, particulates and an amine functionalized hydrophobic polymer, for example, an amine functionalized polyisobutylene and then pumping the slurry through the pipeline. Alternatively, a gas such as nitrogen can be included in the slurry as well.

In all aforementioned compositions and methods for hydrophobising the particulates, such as proppants, an amine functionalized hydrophobic polymer, such as an amine functionalized polyisobutylene or polyisobutylene succinimide, can be used in combination with a silicone or fluoro-based compound, for example, an organic silane or an organic siloxane including cationic modified polysiloxane, such those disclosed in U.S. Pat. No. 7,723,274, or an alkyl amine, for example, tallow amine or octadecyl amine, as disclosed in U.S. Pat. No. 8,105,986. As well, in all aforementioned compositions and methods for hydrophobising the particulates, such as proppants, an amine functionalized hydrophobic polymer, such as an amine functionalized polyisobutylene or polyisobutylene succinimide, can be used in combination with a hydrophobic polymer or mixtures of the amine functionalized hydrophobic polymers can be used.

EXAMPLES

Example 1

0.3 mL of mineral oil containing 3 wt % ATB (amine terminated butadiene homopolymer) and 27 wt % methyl isobutyl carbinol (MIBC) was mixed thoroughly with 60 grams of 20/40 US mesh frac sand in a 200 mL beaker, and then added into 200 mL of water containing 0.03% of a polyacrylamide-based friction reducer. The slurry was stirred at 2500 rpm for 10 seconds, and then let sand settle down. About 50-60% of sand was observed floating on the top, while the rest of sands sitting on the bottom with large amount of attached bubbles and significantly increased sand volume.

Example 2

0.3 mL of mineral oil containing 3% ATBN (amine terminated butadiene-acrylonitrile copolymer) and 27% MIBC was thoroughly mixed with 60 grams of 20/40 US mesh frac sand in a 200 mL beaker and then was added into 200 mL of water containing 0.03% of a polyacrylamide-based friction reducer. The slurry was stirred at 2500 rpm for 10 seconds, and then let sand settle down. About 40-50% of sand was observed floating on the top, while the rest of sands sitting on the bottom with large amount of attached bubbles and significantly increased sand volume.

Example 3

0.6 mL of Afton HiTEC® 5777 (amine-terminated olefin copolymer) and 60 grams of 20/40 US mesh frac sand were mixed thoroughly in a 200 mL beaker, and then was added into 200 mL of 0.03% polyacrylamide aqueous solution containing a few drops of MIBC. The slurry was stirred at 2500 rpm for 10 seconds, and then let sand settle down. About 90-100% of sand was observed floating on the top, while the rest of sands sitting on the bottom with large amount of attached bubbles and significantly increased sand volume.

Example 4

0.3 mL of mineral oil containing 5% amine-terminated polystyrene (average molecular weight 10,000), 27% MIBC, 50% 2-ethoxyethyl acetate was mixed thoroughly with 60 grams of 40/70 US mesh sand in a 200 mL beaker, and then was added into 200 mL of water. The slurry was stirred at 2500 rpm for 10 seconds, and meanwhile added 0.2 mL of friction reducer. About 90-100% of sand was observed floating on the top, while the rest of sands sitting on the bottom with large amount of attached bubbles and significantly increased sand volume.

Example 5

0.3 mL of mineral oil containing 5% amine-terminated poly(L-lactide) (average molecular weight 4,000), 20% MIBC, 40% 2-ethoxyethyl acetate was mixed thoroughly with 60 grams of 40/70 US mesh sand in a 200 mL beaker, and then was added into 200 mL of water. The slurry was stirred at 2500 rpm for 10 seconds, and meanwhile added 0.2 mL of friction reducer. About 60-70% of sand was observed floating on the top, while the rest of sands sitting on the bottom with large amount of attached bubbles and significantly increased sand volume.

Example 6

0.3 mL of mineral oil containing 5% polyisobutylene (PIB) amine and 27% MIBC was mixed thoroughly with 60 grams of 40/70 US mesh sand in a 200 mL beaker, and then added into 200 mL of water. The slurry was stirred at 2500 rpm for 10 seconds, and let sand settle down. About 70-80% of sand was observed floating on the top, while the rest of sands sitting on the bottom with large amount of attached bubbles and significantly increased sand volume.

Example 7

0.3 mL of mineral oil containing 5% polyisobutylene succinimide from Lubrizol and 27% MIBC was mixed thoroughly with 60 grams of 40/70 US mesh sand in a 200 mL beaker, and then added into 200 mL of water. The slurry was stirred at 2500 rpm for 10 seconds, and let sand settle down. About 90-100% of sand was observed floating on the top, while the rest of sands sitting on the bottom with large amount of attached bubbles and significantly increased sand volume.

Example 8

0.3 mL of mineral oil containing 5% polyisobutylene succinimide from Lubrizol was mixed thoroughly with 60 grams of 40/70 US mesh sand in a 200 mL beaker, and then added into 200 mL of water. The slurry was stirred at 2500 rpm for 10 seconds, and let sand settle down. About 10% of sand was observed floating on the top, while the rest of sands sitting on the bottom with large amount of attached bubbles and significantly increased sand volume.

Example 9

0.3 mL of mineral oil containing 27% MIBC was mixed thoroughly with 60 grams of 40/70 US mesh sand in a 200 mL beaker, and then added into 200 mL of water. The slurry was stirred at 2500 rpm for 10 seconds, and let sand settle down. All sand was observed sitting on the bottom with no increase in volume and no bubble attachment.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention, including in any examples, is intended to be illustrative, but not limiting, of the scope of the invention, which is set forth in the following claims.

What is claimed is:

1. A method of preparing a slickwater hydraulic fracturing slurry composition, comprising:
    a) coating a proppant with an amine functionalized hydrophobic polymer selected from the group consisting of amine functionalized polyisobutylene, polyisobutylene succinimide, amine functionalized butadiene polymer, amine functionalized polystyrene, amine-terminated poly(L-lactide) and combinations thereof, to make a coated proppant; and
    b) thereafter, mixing the coated proppant of step a) with water, a friction reducing agent and a gas, to form the slickwater fracturing slurry composition.

2. The method according to claim 1, wherein the amine functionalized hydrophobic polymer is selected from the group consisting of: amine terminated butadiene homopolymer, amine terminated butadiene-acetonitrile copolymer, amine-terminated polystyrene, amine terminated poly(L-lactide) and combinations thereof.

3. The method according to claim 1, wherein the amine functionalized hydrophobic polymer is amine functionalized polyisobutylene.

4. The method to claim 3, wherein the amine functionalized polyolefin is polyisobutylene succinimide.

5. The method according to claim 1, wherein the amine functionalized hydrophobic polymer is amine terminated butadiene polymer.

6. The method according to claim 1, wherein the proppant is selected from the group consisting of: sand, resin coated sand, synthetic polymeric beads, ceramic proppants, glass spheres, bauxite and combinations thereof.

7. The method according to claim 1, wherein the method further comprises adding a frother or oil or a frother and oil combination to the slurry composition.

8. The method according to claim 1, wherein the water, the amine functionalized hydrophobic polymer and the proppant are mixed using conventional mixing methods at sufficient shear.

9. The method according to claim 1 wherein the mixing of the coated proppant with the water occurs while pumping the slurry into a subterranean formation during a slickwater fracturing operation.

10. The method according to claim 1, wherein step a) comprises preparing a liquid medium containing the amine functionalized hydrophobic polymer, contacting the proppant with the liquid medium, and separating the proppant from the medium to generate the coated proppant.

11. The method according to claim 1, wherein step a) is done during a proppant manufacturing process.

12. The method according to claim 1, wherein the slurry comprises no viscosifier.

13. The method according to claim 1, further comprising adding an oil to the slurry composition.

14. The method according to claim 13, wherein the oil is selected from the group consisting of mineral oil, paraffin oil, vegetable oil and combinations thereof.

15. The method according to claim 14, wherein the oil is mineral oil.

16. The method according to claim 1, further comprising adding a frother selected from the group consisting of methyl isobutyl carbinol (MIBC), 2-ethyl hexanol, n-pentanol, n-butyl, n-hexanol, 2-butanol, n-heptanol, n-octanol, isoamyl alcohol, pine oil, terpineol, fenchyl alcohol, alkoxy paraffins such as 1, 1, 3,-triethoxybutane (TEB), polypropyl glycol ether and mixtures thereof, to the slurry composition.

17. The method according to claim 1, wherein the gas is selected from the group consisting of air, nitrogen, carbon dioxide, methane and mixtures thereof.

18. The method according to claim 1, wherein the gas is nitrogen.

19. The method according to claim 1, wherein the gas is carbon dioxide.

20. The method according to claim 1, wherein the proppant is sand.

21. The method according to claim 20, wherein the sand ranges in size from about 10 to about 100 mesh.

22. The method according to claim 21, wherein the gas is nitrogen or carbon dioxide.

23. The method according to claim 22, further comprising adding an oil selected from the group consisting of mineral oil, paraffin oil, vegetable oil and mixtures thereof, to the slurry composition.

24. The method according to claim 23, further comprising adding a frother selected from the group consisting of methyl isobutyl carbinol (MIBC), 2-ethyl hexanol, n-pentanol, n-butyl, n-hexanol, 2-butanol, n-heptanol, n-octanol, isoamyl alcohol, pine oil, terpineol, fenchyl alcohol, alkoxy paraffins such as 1, 1, 3,-triethoxybutane (TEB), polypropyl glycol ether and mixtures thereof, to the slurry composition.

25. The method according to claim 20 wherein the wherein the amine functionalized hydrophobic polymer is amine functionalized polyisobutylene or polyisobutylene succinimide.

* * * * *